United States Patent [19]

Williams

[11] 4,231,574
[45] Nov. 4, 1980

[54] BILLIARD CUE HAVING A QUICK CONNECTOR FOR THE HANDLE PORTION THEREOF

[76] Inventor: William J. Williams, 11016 Mohawk, Apple Valley, Calif. 92307

[21] Appl. No.: 957,838

[22] Filed: Nov. 6, 1978

[51] Int. Cl.² ............................................. A63D 15/08
[52] U.S. Cl. ....................................... 273/68; 403/350; 403/292; 273/81.2
[58] Field of Search ............... 403/350, 292, 293, 104, 403/DIG. 7, DIG. 4; 273/68, 70, 81.2; 46/28

[56] References Cited

U.S. PATENT DOCUMENTS

| 965,131 | 7/1910 | Bliss | 403/350 X |
| 970,172 | 9/1910 | Bloom et al. | 273/68 X |
| 2,122,244 | 6/1938 | Brown | 403/350 X |

FOREIGN PATENT DOCUMENTS 56986 11/1939 Denmark ......................... 403/DIG. 8

Primary Examiner—George J. Marlo
Attorney, Agent, or Firm—John T. Matlago

[57] ABSTRACT

A quick connector is provided for attaching the handle portion of a billiard cue to the shaft portion thereof. The connector includes fittings carried by the ends of the handle and shaft portions. The fitting on the end of the handle portion comprises a cylindrical body having an eccentric shoulder and an elongated central stud on the outer end thereof. The fitting on the end of the shaft portion comprises a cylindrical body having an elongated central bore and an eccentric counterbore on the outer end thereof. The end of the handle portion is initially loosely joined with the end of the shaft portion by inserting the elongated central stud into the elongated central bore and the eccentric shoulder into the eccentric counterbore. Then by twisting the portions relative to each other for a fraction of a turn, the eccentric shoulder cams against the eccentric counterbore thereby causing the central stud to frictionally engage the wall of the central bore.

6 Claims, 7 Drawing Figures

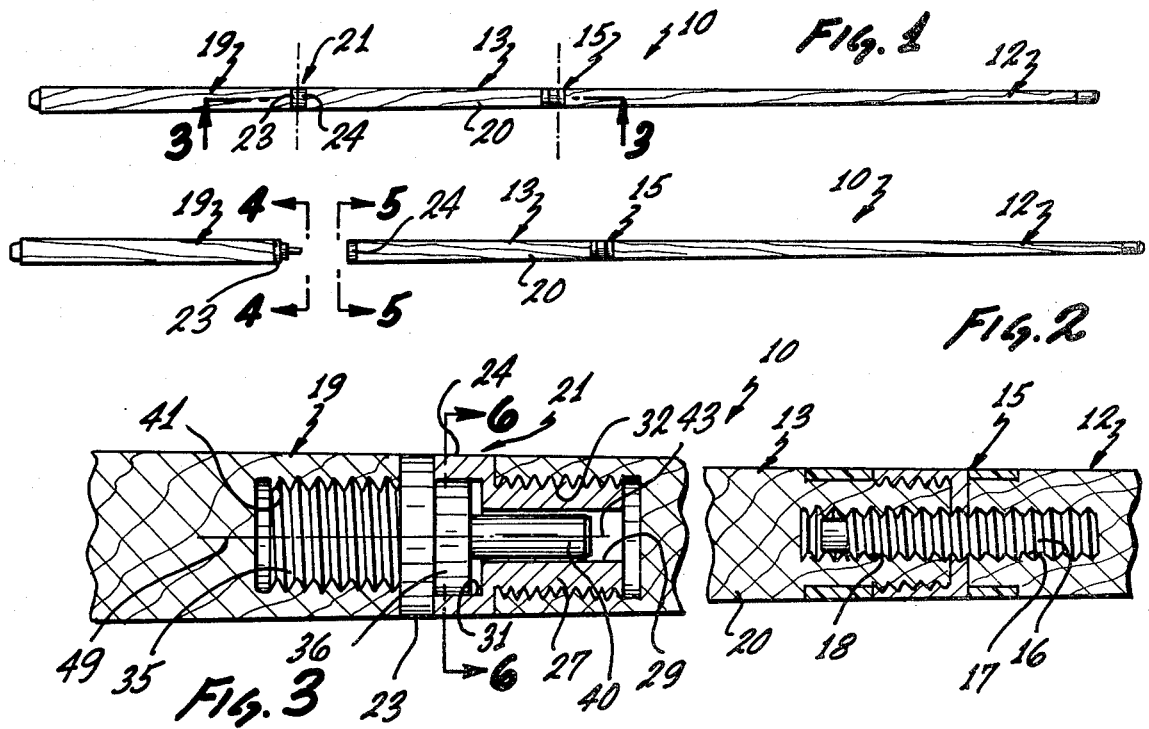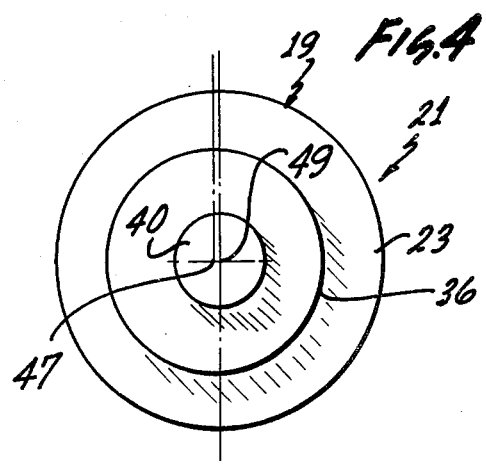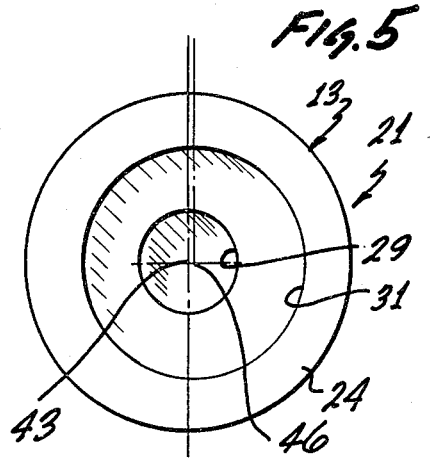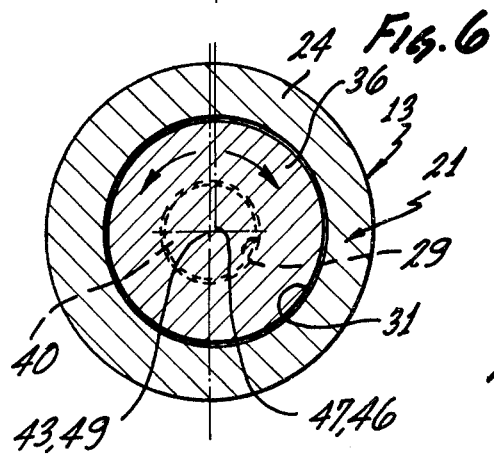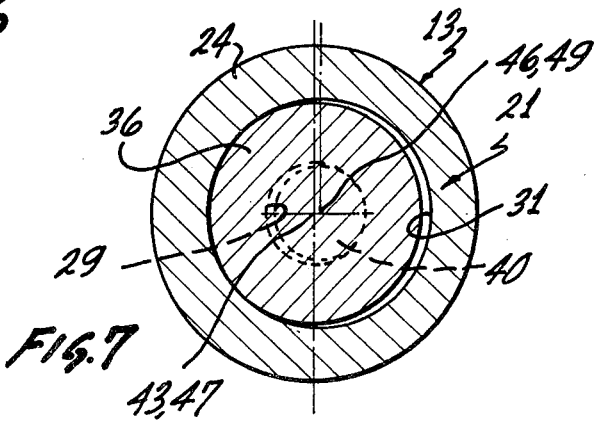

BILLIARD CUE HAVING A QUICK CONNECTOR FOR THE HANDLE PORTION THEREOF

BACKGROUND AND SUMMARY OF THE INVENTION

This invention relates to billiard cues and more particularly to a billiard cue provided with a quick connector for the handle portion thereof.

In many homes having pool tables there is not enough space around the table to always permit the player to make a play with a standard length billiard cue. At such times it would be highly desirable to be able to quickly shorten the length of the billiard cue to make the play by disconnecting the handle portion of the billiard cue from the shaft portion thereof. Then, after the play has been made, to just as quickly rejoin the handle portion back onto the shaft portion so that play may be resumed with a standard length billiard cue. However, threaded connectors of the type conventionally employed to join portions of billiard cues to each other are not practical for such purposes since they require several turns of the portions relative to each other to form the joint and therefore take up too much time to disconnect and then reconnect the handle portion during a play. Accordingly, it is seen that there is a need for a low cost simple connector which can be used to quickly join the handle portion of a billiard cue to the shaft portion thereof.

In summary, the connector of the present invention comprises fittings carried on the ends of the shaft and handle portions of a billiard cue. The fittings carried on the end of the handle portion includes an eccentric shoulder provided with a smaller diameter concentric elongated stud on the outer end thereof. The fitting carried on the end of the shaft portion includes an elongated concentric bore having a diameter corresponding to that of the stud and an eccentric counterbore on the outer end thereof having a diameter corresponding to that of the eccentric shoulder. The fittings are adapted to be readily axially mated together with the concentric stud freely received in the concentric bore and with the eccentric shoulder freely received in the eccentric counterbore. Then, by axially twisting the handle portion a fraction of a turn relative to the shaft portion, the eccentric shoulder of the handle portion fitting is caused to be cammed against the eccentric counterbore of the shaft portion fitting to thereby radially displace the handle portion fitting such that its concentric stud frictionally bears with a clamping force against the wall of the concentric bore in the shaft portion fitting. By axially twisting the handle portion relative to the shaft portion a fraction of a turn in the opposite direction the clamping force between the fittings is released such that the handle portion can be axially disconnected from the shaft portion.

Accordingly, one of the objects of the present invention is to provide a connector for the handle portion of a billiard cue which enables a player to quickly remove the handle portion and thereby shorten the billiard cue when there is not enough space around a pool table to make a play with a standard length billiard cue.

A further object of the present invention is to provide a connector for axially joining the handle portion of a billiard cue to the shaft portion thereof when the handle portion is twisted a fraction of a turn in either direction relative to the shaft portion.

Another object of the present invention is to provide a quick connector for joining the handle portion of a billiard cue to the shaft portion thereof which is economical to manufacture.

With these and other objects in view, the invention consists of the construction, arrangement and combination of the various parts of the device whereby the objects contemplated are attained as hereinafter more fully set forth, pointed out in the appended claims and illustrated in the accompanying drawings.

BRIEF DESCRIPTION OF THE DRAWINGS

FIG. 1 is a top plan view of a billiard cue incorporating the connector of the present invention for axially joining the handle portion to the shaft portion thereof;

FIG. 2 is a top plan view of the billiard cue of FIG. 1 which has been shortened for play by disconnecting the handle portion therefrom;

FIG. 3 is an elongated sectional view taken along line 3—3 of FIG. 1;

FIG. 4 is an enlarged end view of the handle portion fitting taken along line 4—4 of FIG. 2;

FIG. 5 is an enlarged end view of the shaft portion fitting taken along line 5—5 of FIG. 2;

FIG. 6 is a sectional view taken along line 6—6 of FIG. 3 showing the handle portion fitting when it is initially axially received in the shaft portion fitting; and FIG. 7 is a sectional view similar to FIG. 6 showing the handle portion fitting tightly clamped to the shaft portion fitting after these portions have been twisted a fraction of a turn relative to each other.

DESCRIPTION OF PREFERRED EMBODIMENT

Referring to FIG. 1 of the drawings, a billiard cue 10 is shown typically having a constant taper substantially from one end to the other and a standard overall length of sixty inches. In order to be able to transport the billiard cue 10 it is generally formed in a well known manner as shown into a separate tip half section 12 and butt half section 13 which sections are joined by a threaded connector 15 of conventional type. Thus, the connector 15 includes an elongated threaded pin 16 having one end portion permanently engaged in a threaded bore 17 provided on the end of the tip half section 12 and having the other end portion releaseably engaged in a threaded bore 18 provided on the end of the butt half section 13. It should be noted that by use of such a threaded connector it takes several turns of the butt half section 13 relative to the tip half section 12 to axially join or unjoin these portions. It should be appreciated, of course, that billiard cues may also be conventionally formed of single length shafts.

In accordance with the present invention the billiard cue 10 is provided with a quick connector 21 for connecting the handle portion 19 of the butt half section 13 to the shaft portion 20. It should be noted that the handle portion 19 is approximately 15 inches in length or approximately half the length of the butt half section 13 of the billiard cue 10. The connector 21 includes a fitting 23 permanently secured on the handle portion 19 and a fitting permanently secured on the end of the shaft portion 20.

The fitting 23 carried on the end of the handle portion 19 comprises a cylindrical body having a central longitudinal axis 49 and an elongated reduced diameter threaded portion 35 on the inner end thereof which is concentric with the outer surface of the cylindrical body. The cylindrical body includes on the outer end thereof an eccentrically turned shoulder 36 with a projecting elongated cylindrical central stud 40. It should now be clearly understood, as illustrated in FIG. 4, that the stud 40 is concentrically turned about the central longitudinal axis 49 of fitting 23 while the shoulder 36 is concentrically turned about the axis 47 which is offset from axis 49 a few thousandths of an inch. The threaded end portion 35 of the fitting 24 engages threads on an axial opening 41 provided on the end of the handle portion 19.

The fitting 24 comprises a cylindrical body having a central longitudinal axis 43 and an elongated reduced diameter threaded portion 27 on the inner end thereof provided with a central bore 29 having a diameter corresponding in size with the central stud 40. Both the threaded portion 27 and central bore 29 are concentric with the outer surface of the cylindrical body of fitting 24. An eccentric counterbore 31 having a diameter corresponding in size to the eccentric shoulder 36 on fitting 23 is provided on the outer end of the cylindrical body of fitting 24. It should now be clearly understood, as illustrated in FIG. 5, that the central bore 29 is concentrically turned about the central longitudinal axis 43 of the fitting 24 while the counterbore 31 is concentrically turned about an axis 46 which is offset from axis 43 substantially the same amount as the axis 47 of shoulder 36 on fitting 23 is offset from its central longitudinal axis 49. The threaded end porion 27 of the fitting 24 engages threads on an axial opening 32 provided on the end of the shaft portion 20.

When the elongated central stud 40 on the fitting 23 carried on the end of the handle portion 19 is inserted into the elongated central bore 29 of the fitting 24 carried on the end of the shaft portion 20 these portions may readily axially twist a little relative to each other in order for the eccentric shoulder 36 to be received in the eccentric counterbore 31, or it may be necessary on some occasions to deliberately so twist these portions a slight fraction of a turn relative to each other to enable the shoulder 36 to be received in the counterbore 31. When this mating occurs the fitting 23 on the end of the handle portion 19 is loosely axially joined to fitting 24 on the end of the shaft portion 20 with the outer circular end of the fitting 23 abutting the outer circular end of the fitting 24. When so joined the central longitudinal axis 49 of fitting 23 is substantially coincident with the central longitudinal axis 43 of the fitting 24 and the offset axis 47 of the shoulder 36 is substantially coincident with the offset axis 46 of the counterbore 31 as illustrated in FIG. 6.

Now then, in order to securely axially connect or clamp the handle portion 19 to the shaft portion 20, these portions need be merely manually axially twisted relative to each other a fraction of a turn in one direction or the other, i.e., in a clockwise or counterclockwise direction. The axial twisting of the handle portion 19 in either direction causes the circumferential surface of the eccentric shoulder 36 on fitting 23 to cam against the circumferential surface of the eccentric counterbore 31 on fitting 24 as illustrated in FIG. 7. This causes a sidewise radial displacement of the fitting 23 which forces the circumferential surface of its central stud 40 to bear against the diametrically opposite circumferential wall of the central bore 29 in the fitting 24 with an increased radial clamping force. When so clamped, the offset axis 47 of the concentric shoulder 36 is substantially coincident with the central longitudinal axis 43 of the fitting 24 and the offset axis 46 of the counterbore 31 is substantially coincident with the central longitudinal axis 49 of the fitting 23. The exact location of these axes relative to each other is dependent of course on the actual offset of the axes and the machining tolerances. It should now be clearly understood that the radial clamping force between fittings 23 and 24 releaseably anchors the handle portion 19 to the shaft portion 30 of the billiard cue 10. Thus, the billiard cue 10, with the handle portion 19 attached thereto to make it of a standard length, can be used for play in a conventional manner.

To disconnect the handle portion 19 from the shaft portion 20 of the billiard cue 10 anytime during play, the handle portion 19 need be merely manually twisted a fraction of a turn in the opposite direction relative to the shaft portion 20 to readily relieve the clamping force. This enables the fittings 23 and 24 to be quickly separated to enable a play to be made with the shortened billiard cue when there is not enough space around the table to permit a player to make the play with a standard length billiard cue. Immediately after the play, the handle portion 19 can be again quickly axially secured by use of the connector 21 to the end of the shaft portion to enable play to be resumed with a standard length billiard cue.

It should now be noted that the central stud 40 on the fitting 23 and the central bore 29 on the fitting 24 are especially elongated to be on the order of two to three times the diameter thereof, as shown in the drawing, to axially align the handle portion 19 and the shaft portion 20 when they are first brought together and thereby assist in mating the eccentric shoulder 36 with the eccentric counterbore 31. Furthermore, these parts are purposely elongated to increase the area of frictional engagement and thereby the radial clamping force of the connector when the portions are twisted.

While the description had been concerned with a particular embodiment of the invention, it is to be understood that many modifications and variations in the construction and arrangement thereof may be provided for without departing from the spirit and scope of the invention or sacrificing any of its advantages. The invention is therefore considered as including all such possible modifications and variations coming within the legitimate and valid scope of the appended claims.

What is claimed is:

1. A billiard cue comprising:
   a handle portion;
   a shaft portion; and
   fittings carried on the ends of the handle portion and shaft portion;
   one of said fittings provided with a concentric central bore and an eccentric counterbore;
   the other of said fittings provided with a concentric central stud and an eccentric shoulder;
   said fittings adapted to be axially mated with the concentric stud received in the concentric central bore and with the eccentric shoulder received in the eccentric counterbore;
   whereby when the handle portion and the shaft portion are relatively twisted for a fraction of a turn the shoulder engages the counterbore and the central stud engages the central bore to thereby securely axially clamp said handle portion to said shaft portion.

2. A billiard cue as defined in claim 1 wherein said one fitting is carried on the end of said shaft portion and said other fitting is carried on the end of said handle portion.

3. A billiard cue as defined in claim 1 wherein said handle portion has a length of approximately one fourth the overall length of said billiard cue.

4. A billiard cue as defined in claim 1 wherein said central bore and central stud have lengths on the order of two to three times the diameter thereof.

5. A billiard cue as defined in claim 1 wherein said fittings are provided with threaded end portions engaging axial threaded openings on the ends of said shaft and handle portions.

6. A billiard cue as defined in claim 1 wherein said central bore and central stud are of smaller diameter than said shoulder and counterbore.

* * * * *